US008215006B2

(12) United States Patent
Yin et al.

(10) Patent No.: US 8,215,006 B2
(45) Date of Patent: Jul. 10, 2012

(54) JIG FOR PROBE CONNECTOR

(75) Inventors: Te-Hung Yin, Taipei (TW); Jui-Pin Lin, Taipei (TW); Yung-Yi Chen, Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 457 days.

(21) Appl. No.: 12/626,627

(22) Filed: Nov. 26, 2009

(65) Prior Publication Data

US 2011/0124215 A1 May 26, 2011

(51) Int. Cl.
*B23P 19/00* (2006.01)
*H01R 43/00* (2006.01)

(52) U.S. Cl. ................. 29/755; 29/749; 29/754; 29/760

(58) Field of Classification Search .................... 29/755, 29/745, 749, 754, 760; 439/169, 289, 578, 439/607.01, 824, 857

See application file for complete search history.

(56) References Cited

U.S. PATENT DOCUMENTS 6,935,906 B2 * 8/2005 Orihara ......................... 439/824
7,293,357 B2 * 11/2007 Holland .......................... 29/857

* cited by examiner

*Primary Examiner* — Thiem Phan
(74) *Attorney, Agent, or Firm* — Lin & Associates IP, Inc.

(57) ABSTRACT

A jig for probe connector adapted for clutching a plurality of probe assemblies each of which has a connecting portion, a probing pin and a soldering portion disposed at two ends of the connecting portion respectively. The jig for probe connector has a base body. The base body has a plurality of passageways each penetrating a front end thereof. The passageway includes a first receiving recess and a second receiving recess disposed at a front of the first receiving recess. A cross section of the second receiving recess is larger than that of the first receiving recess, with a drop defined as a preventing portion formed therebetween. A side of the second receiving recess has a portion protruded inward to form a buckling lump, which is spaced from the preventing portion with a predetermined distance.

6 Claims, 5 Drawing Sheets

JIG FOR PROBE CONNECTOR

BACKGROUND OF THE INVENTION

1. Field of the Invention

The invention relates to a jig, and more particularly to a jig for a probe connector.

2. The Related Art

Please refer to FIG. 1, a conventional probe connector 200 includes an insulating housing 20 and a plurality of probe assemblies 30. The insulating housing 20 has a plurality of grooves (not shown) for receiving the probe assemblies 30. The probe assembly 30 has a circular connecting portion 31. A front end and a rear end of the connecting portion 31 are formed with a telescopic probing pin 32 and a soldering portion 33 respectively. Both the probing pin 32 and the soldering portion 33 are column shape and disposed in alignment with each other. A diameter of the probing pin 32 is smaller than that of the soldering portion 33. The soldering portions 33 of the probe assemblies 30 are soldered to a PCB of an electronic device to form electrical connections between the probe connector 200 and the electronic device. Nevertheless, when the probe assemblies 30 are assembled to the insulating housing 20, the probe assemblies 30 are unable to be exactly positioned in the grooves of the insulating housing 20, which makes the tip ends of the soldering portions 33 of the probe assemblies 30 can not align with each other. The ragged tip ends of the soldering portions 33 are difficult to be soldered to the PCB, which decreases soldering efficiency, furthermore, affects soldering quality. So it is desirable and necessary to design a jig for the probe connector which can conveniently assemble the probe assemblies 30 to the insulating housing 20, solving the problem mentioned above.

SUMMARY OF THE INVENTION

An object of the present invention is to provide a jig for probe connector adapted for clutching a plurality of probe assemblies each of which has a connecting portion, a probing pin and a soldering portion disposed at two ends of the connecting portion respectively. The jig for probe connector has a base body. The base body has a plurality of passageways each penetrating a front end thereof. The passageway includes a first receiving recess and a second receiving recess disposed at a front of the first receiving recess. A cross section of the second receiving recess is larger than that of the first receiving recess, with a drop defined as a preventing portion formed therebetween. A side of the second receiving recess has a portion protruded inward to form a buckling lump, which is spaced from the preventing portion with a predetermined distance. When the probe assemblies are received in the passageways, the probing pins are located in the first receiving recesses, and the connecting portions are received in the second receiving recesses and restrained between the preventing portions and the buckling lumps, with tip ends of the soldering potions exposing outside the base body.

As described above, the probe assemblies are clutched together by the jig for probe connector. The tip ends of the soldering potions can keep flush with each other, which is convenient for the progress of the soldering and improves the welding quality and efficiency. So the jig for probe connector is excellent and can be used widely.

BRIEF DESCRIPTION OF THE DRAWINGS

The present invention will be apparent to those skilled in the art by reading the following description of an embodiment thereof, with reference to the attached drawings, in which.

DETAILED DESCRIPTION OF THE EMBODIMENT

Figure 3:
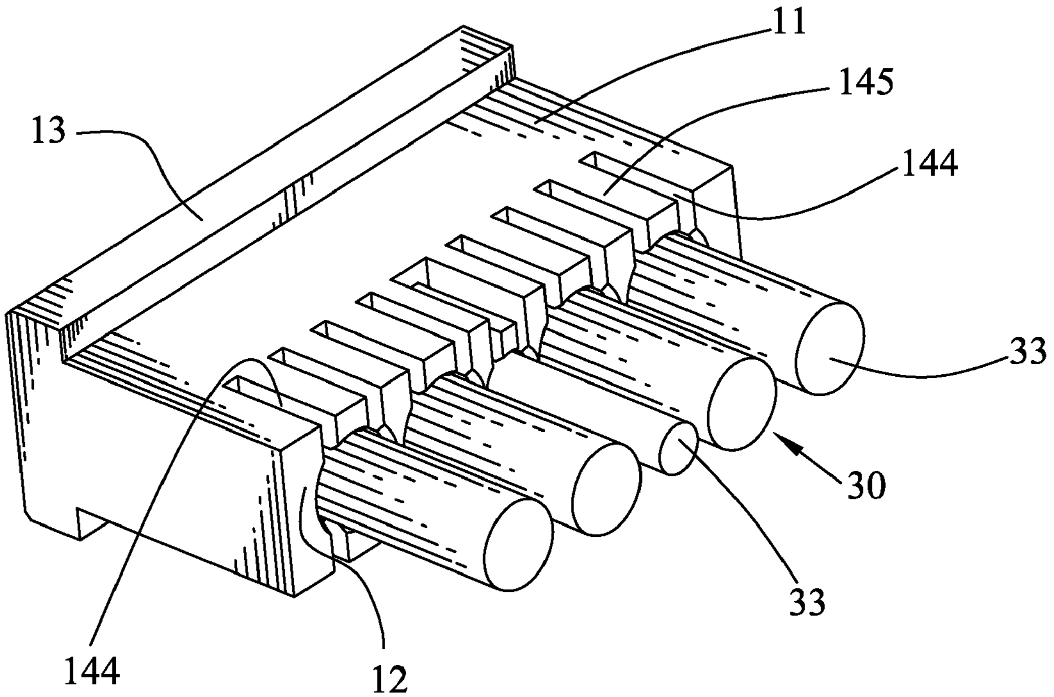
FIG. 3 is a perspective view of the jig for probe connector shown in FIG. 2, wherein a plurality of probe assemblies is received in the jig for probe connector.
Figure 4:
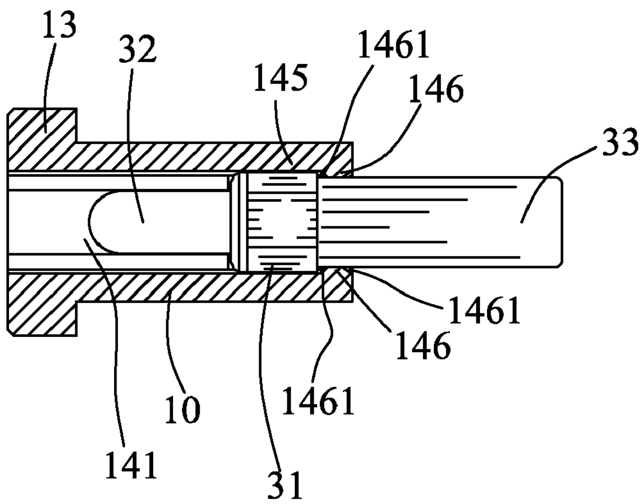
FIG. 4 is a cross-sectional view of the jig for probe connector shown in FIG. 3, wherein the probe assembly is assembled therein.
Figure 5:
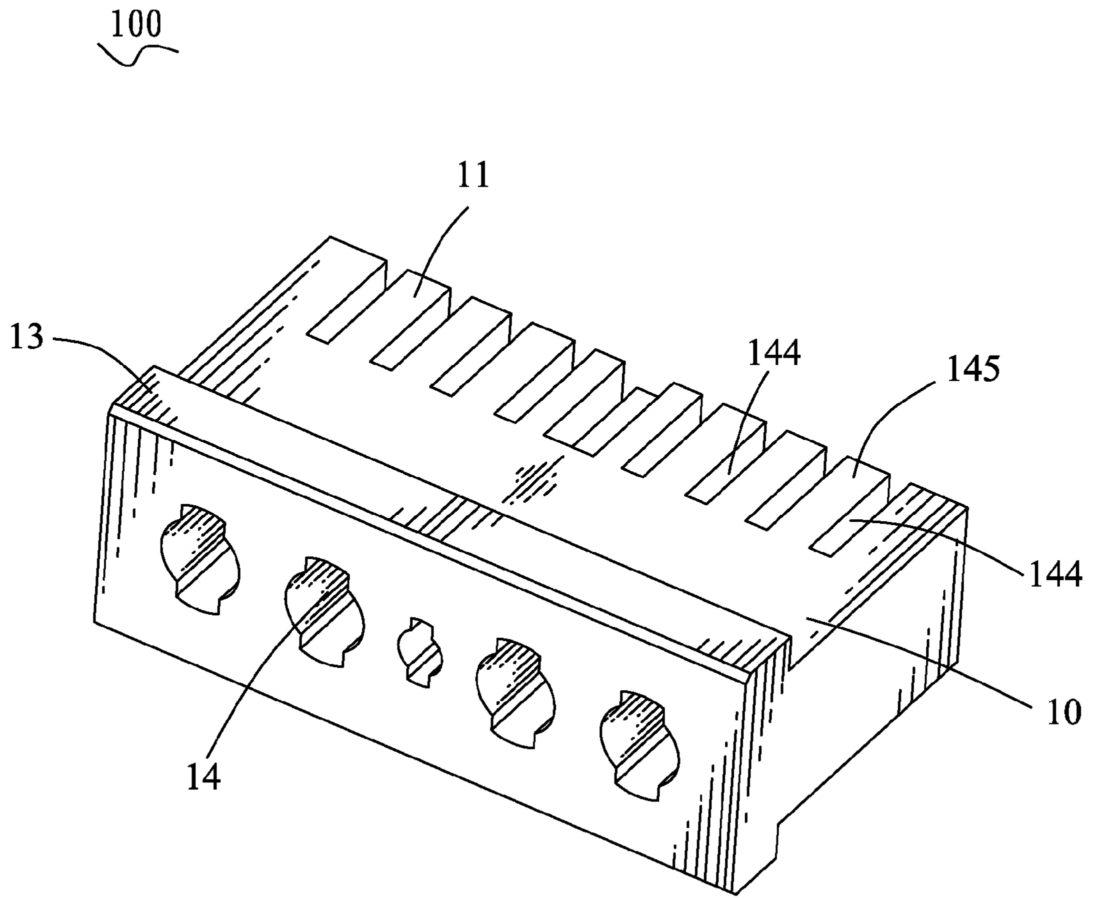
FIG. 5 is a perspective view of the jig for probe connector.
Figure 6:
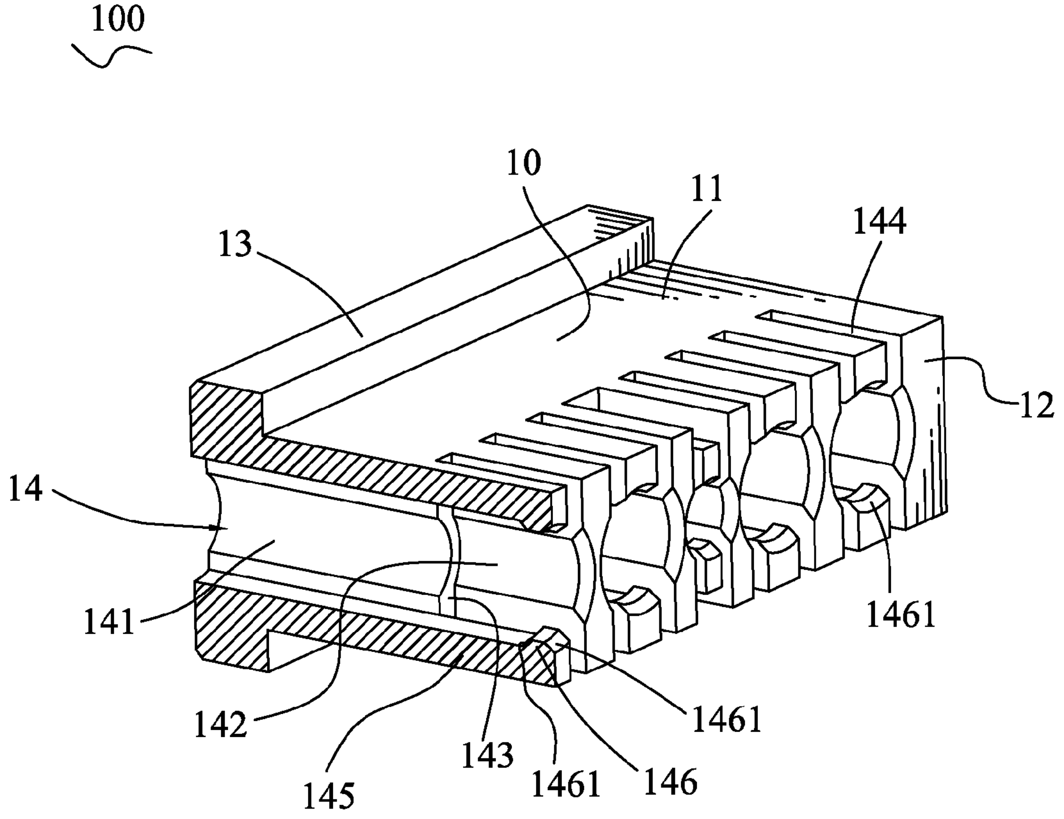
FIG. 6 is a cross-sectional view of the jig for probe connector shown in FIG. 5.

Please refer to FIGS. 3-6, a jig 100 for probe connector 200 according to the present invention is shown. The jig 100 for probe connector 200 may be molded by insulating or metal materials and has a rectangular base body 10. The base body 10 defines a top surface 11 and a front end 12. A rear end of the top surface 11 extends upwards to form a dismounting flange 13 for separating the jig 100 for probe connector 200 from the probe connector 200 conveniently. The front end 12 has a plurality of passageways 14 arranged side by side, each extending frontward and rearward and penetrating a rear end of the base body 10. The passageway 14 includes a first receiving recess 141 and a second receiving recess 142 disposed at a front end of the first receiving recess 141. Cross-sections of the first receiving recess 141 and the second receiving recess 142 are concentric circles. A diameter of the second receiving recess 142 is greater than that of the first receiving recess 141. A drop is formed between the first receiving recess 141 and the second receiving recess 142, which is named as a preventing portion 143. Each of an upper and a lower side of the second receiving recess 142 has a pair of abreast recesses 144, passing through the top surface 11 and a bottom surface of the base body 10. Each pair of the abreast recesses 144 are spaced from each other, with a clamping arm 145 formed therebetween. Two facing clamping arms 145 have free ends extended towards each other to form two buckling lumps 146, which are spaced from the preventing portion 143 with a predetermined distance. Each of the buckling lumps 146 is formed with a guide surface 1461 at a front end and a rear end thereof, for facilitating assembling and disassembling the probe assemblies 30. All of the preventing portions 143 are disposed in alignment with each other and the distance between the preventing portion 143 and the buckling lumps 146 are uniform. It should be noted that the passageways have the same structure and function, and can be changed in the dimension, according to the probe assemblies of the probe connector.

Figure 1:
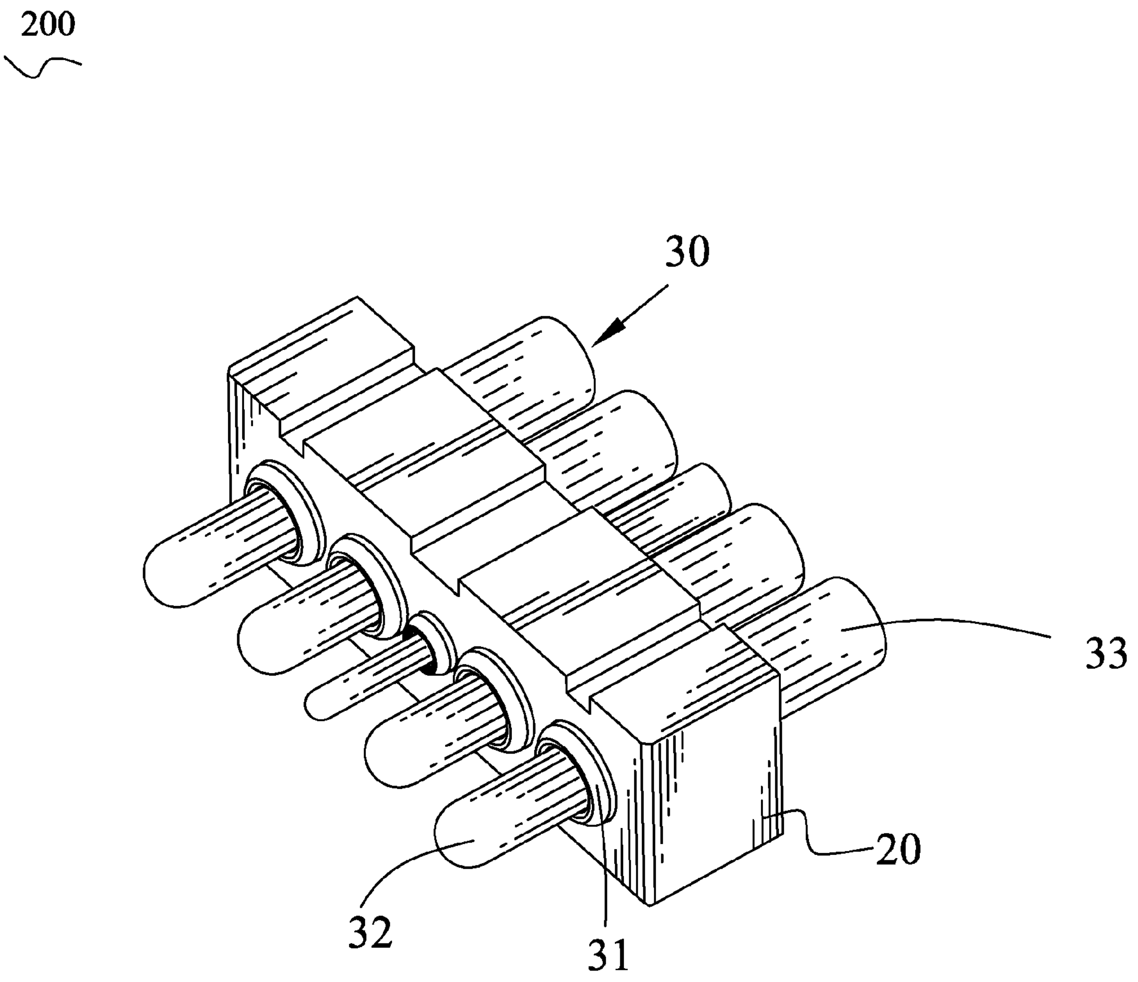
FIG. 1 is an assembled, perspective view of a conventional probe connector.
Figure 2:
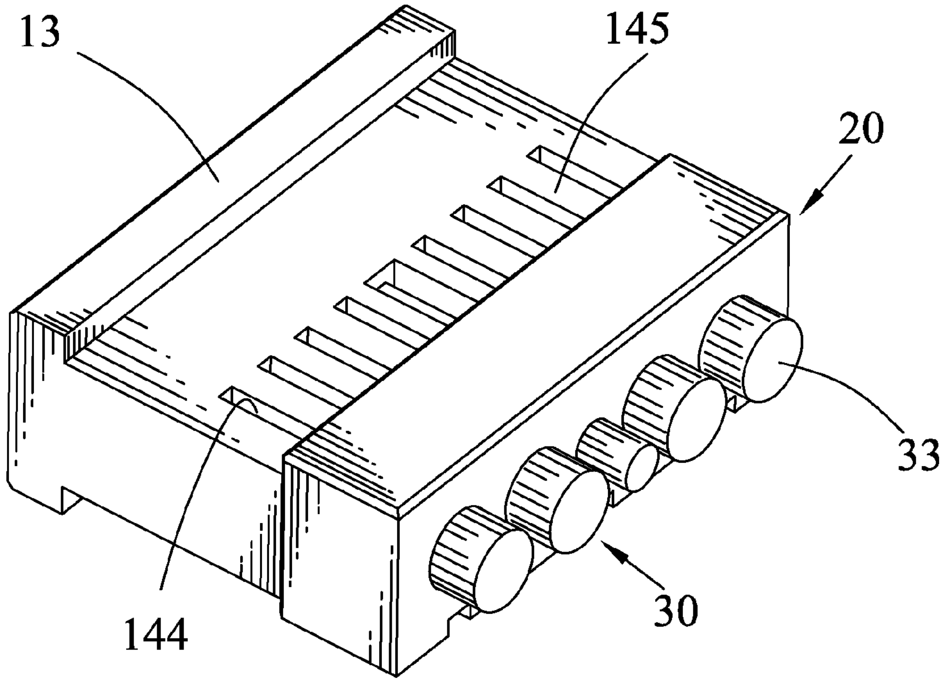
FIG. 2 is a perspective view showing that the probe connector of FIG. 1 mates with a jig for probe connector in accordance with the present invention.

Please refer to FIGS. 1-4 and FIG. 6, when the probe assemblies 30 are mounted to the insulating housing 20 of the probe connector 200, the probe assemblies 30 will be inserted into the passageways 14 of the jig 100 for probe connector 200. The probing pin 32 is received in the first receiving recess 141, and the connecting portion 31 is received in the second receiving recess 142 and restrained between the preventing portion 143 and the buckling lumps 146. The soldering portions 33 expose out of the base body 10, with tip ends thereof aligned with each other. Thus, the soldering portions 33 are inserted into the grooves of the insulating housing 20, with the tip ends thereof projecting outside the insulating housing 20 aligned with each other. Afterwards, the jig 100 for probe connector 200 is separated from the probe assemblies 30, and the probe assemblies 30 are mounted to the insulating housing 20 of the probe connector 200 in order.

As describe above, the probe assemblies 30 are clutched together by the jig 100 for probe connector 200. The tip ends of the soldering potions 33 can keep flush with each other, which is convenient for the progress of the soldering and improves the welding quality and efficiency. So the jig 100 for probe connector 200 is excellent and can be used widely.

Furthermore, the present invention is not limited to the embodiment described above; various additions, alterations and the like may be made within the scope of the present invention by a person skilled in the art. For example, respective embodiments may be appropriately combined.

What is claimed is:

1. A jig for probe connector adapted for clutching a plurality of probe assemblies, each of which has a connecting portion, a probing pin and a soldering portion disposed at two ends of the connecting portion respectively, comprising:

a base body, the base body having a plurality of passageways, each penetrating a front end thereof, the passageway including a first receiving recess and a second receiving recess disposed at a front of the first receiving recess, a cross section of the second receiving recess being larger than that of the first receiving recess, with a drop defined as a preventing portion formed therebetween, a side of the second receiving recess having a portion protruded inward to form a buckling lump, which is spaced from the preventing portion with a predetermined distance, wherein the probe assemblies are received in the passageways, the probing pins are located in the first receiving recesses, and the connecting portions are received in the second receiving recesses and restrained between the preventing portions and the buckling lumps, with tip ends of the soldering potions exposing outside the base body.

2. The jig for probe connector as claimed in claim 1, wherein the second receiving recess has two facing bucking lumps.

3. The jig for probe connector as claimed in claim 2, wherein each of an upper side and a lower side of the second receiving recess has a pair of abreast recesses, passing through a top surface and a bottom surface of the base body, each pair of the abreast recesses are spaced from each other, with a clamping arm formed therebetween, two facing clamping arms have free ends protruded towards each other to form the buckling lumps.

4. The jig for probe connector as claimed in claim 1, wherein an upper side of the second receiving recess have a pair of abreast recesses, passing through a top surface of the base body, the abreast recesses are spaced from each other, with a clamping arm formed therebetween, the buckling lump has a free end protruded inward to form the buckling lump.

5. The jig for probe connector as claimed in claim 1, wherein the buckling lump is formed with two guide surfaces at a front end and a rear end thereof, for facilitating assembling and disassembling the probe assemblies.

6. The jig for probe connector as claimed in claim 1, wherein a rear end of the top surface of the base body extends upwards to form a dismounting flange for disassembling the jig for probe connector conveniently.

* * * * *